(12) United States Patent
Kämäräinen et al.

(10) Patent No.: US 12,222,434 B2
(45) Date of Patent: Feb. 11, 2025

(54) NODE POSITIONING

(71) Applicant: Iiwari Tracking Solutions Oy, Vuokatti (FI)

(72) Inventors: Jukka Kämäräinen, Vuokatti (FI); Pertti Erkkilä, Vuokatti (FI)

(73) Assignee: Iiwari Tracking Solutions Oy, Vuokatti (FI)

( * ) Notice: Subject to any disclaimer, the term of this patent is extended or adjusted under 35 U.S.C. 154(b) by 453 days.

(21) Appl. No.: 17/847,176

(22) Filed: Jun. 23, 2022

(65) Prior Publication Data

US 2022/0413085 A1  Dec. 29, 2022

(30) Foreign Application Priority Data

Jun. 24, 2021 (FI) .................................. 20215753

(51) Int. Cl.
*G01S 5/10* (2006.01)
*G01S 5/02* (2010.01)
*G01S 5/06* (2006.01)

(52) U.S. Cl.
CPC ............ *G01S 5/10* (2013.01); *G01S 5/02216* (2020.05); *G01S 5/06* (2013.01)

(58) Field of Classification Search
CPC ........... G01S 5/02216; G01S 5/06; G01S 5/10
See application file for complete search history.

(56) References Cited

U.S. PATENT DOCUMENTS

2012/0086607 A1   4/2012   Ameti et al.
2019/0317183 A1   10/2019  Kämäräinen

OTHER PUBLICATIONS

Overman: Wireless Clock Synchronisation for UWB Positioning. Master's Thesis Faculty of Electrical Engineering, Mathematics and Computer Science Delft University of Technology, Aug. 25, 2019.
Zhao et al: A New TOA Localization and synchronization System With Virtually Synchronized Periodic Asymmetric Ranging Network. IEEE Internet of Things Journal, Jun. 1, 2021, vol. 8, No. 11, pp. 9030-9044.

*Primary Examiner* — Bernarr E Gregory
*Assistant Examiner* — Fred H Mull
(74) *Attorney, Agent, or Firm* — Laine IP Oy

(57) ABSTRACT

According to an example aspect of the present invention, there is provided a method comprising obtaining a first length of time, a second length of time, a third length of time, a fourth length of time and a fifth length of time, and determining a time difference of arrival of a signal from a wireless tag between the first and second non-master base stations based on the determined lengths of time.

20 Claims, 7 Drawing Sheets

NODE POSITIONING

FIELD

The present disclosure relates to positioning of wireless nodes, such as wireless tag devices.

BACKGROUND

Determining a location of a device using wireless signals may be accomplished by using signals from wireless stations of known locations, for example. Additionally or alternatively, stations at known locations may receive signals from a device to determine the location of the device. Wireless signals may, in general, comprise radio signals, or signals in other parts of the electromagnetic spectrum than the radio part, or sound signals.

Trilateration comprises determining locations of points by measuring distances. To determine a location on a two-dimensional surface, such as terrain, determining that a location lies on two intersecting circles provides two possible locations. A third circle, or another kind of additional piece of information, may be used to select one of the two possible locations. This method is also referred to as TOA positioning, time of arrival location method.

Triangulation on the other hand comprises determining a location using triangles that are determined for positioning. This method is also referred to as AOA positioning, angle of arrival location method. Unlike trilateration, in triangulation angles are determined, rather than distances. A combination of trilateration and triangulation, that is, determination of both angles and distances, may be referred to as triangulateration.

Multilateration, on the other hand, is based on determining differences in distance to known locations, rather than distances as such. When two known stations are used, the location is determined as lying on a hyperbolic curve or surface and additional information may be employed to select point on the hyperbolic curve or surface as the estimated location of the device. This method is also referred to as TDOA positioning, time difference of arrival location method.

SUMMARY

According to some aspects, there is provided the subject-matter of the independent claims. Some embodiments are defined in the dependent claims.

According to a first aspect of the present disclosure, there is provided a method comprising obtaining a first length of time, limited by receipt of a second message in a first non-master base station and by receipt of a signal from a wireless tag in the first non-master base station, obtaining a second length of time, limited by receipt of the second message in the first non-master base station and by receipt of a first message in the first non-master base station, obtaining a third length of time, limited by receipt of the second message in a second non-master base station and by receipt of the signal from the wireless tag in the second non-master base station, obtaining a fourth length of time, limited by receipt of the second message in the second non-master base station and by receipt of the first message in the second non-master base station and obtaining a fifth length of time, limited by a time of transmission of the first message from a master base station and a time of transmission of the second message, of a same type as the first message, from the master base station, and determining a time difference of arrival of the signal from the wireless tag between the first and second non-master base stations as the first length of time multiplied by a ratio of the fifth length of time and the second length of time, to which is added a time of flight at light speed from the master base station to the first non-master base station and from which is subtracted a product of the third length of time and a ratio of the fifth length of time and the fourth length of time, and from which is subtracted a time of flight at light speed from the master base station to the second non-master base station.

According to a second aspect of the present disclosure, there is provided a method comprising obtaining a first length of time, limited by receipt of a second message in a first non-master base station and by receipt of a signal from a wireless tag in the first non-master base station, obtaining a second length of time, limited by receipt of the second message in the first non-master base station and by receipt of a first message in the first non-master base station, obtaining a third length of time, limited by receipt of the second message in a second non-master base station and by receipt of the signal from the wireless tag in the second non-master base station, obtaining a fourth length of time, limited by receipt of the second message in the second non-master base station and by receipt of the first message in the second non-master base station and obtaining a fifth length of time, limited by a time of transmission of the first message from a master base station and a time of transmission of the second message, of a same type as the first message, from the master base station, and determining a time difference of arrival of the signal from the wireless tag between the first and second non-master base stations as the third length of time multiplied by a ratio of the fifth length of time and the fourth length of time, to which is added a time of flight at light speed from the master base station to the second non-master base station and from which is subtracted a product of the first length of time and a ratio of the fifth length of time and the second length of time, and from which is subtracted a time of flight at light speed from the master base station to the first non-master base station.

According to a third aspect of the present disclosure, there is provided a method comprising obtaining a first length of time, limited by transmission of a second message from a master base station and by receipt of a signal from a wireless tag in the master base station, obtaining a second length of time, limited by a time of transmission of a first message from a master base station and a time of transmission of the second message, of a same type as the first message, from the master base station, obtaining a third length of time, limited by receipt of the second message in a non-master base station and by receipt of the signal from the wireless tag in the non-master base station, and obtaining a fourth length of time, limited by receipt of the second message in the non-master base station and by receipt of the first message in the non-master base station and obtaining a ratio between the second length of time and the fourth length of time, and determining a time difference of arrival of the signal from the wireless tag between the master base station and the non-master base station as the third length of time multiplied by the ratio, from which the first length of time is subtracted and to which a time of flight at light speed from the master base station to the non-master base station is added.

According to a fourth aspect of the present disclosure, there is provided a method comprising obtaining a first length of time, limited by transmission of a second message from a master base station and by receipt of a signal from a wireless tag in the master base station, obtaining a second length of time, limited by a time of transmission of a first message from a master base station and a time of transmission of the second message, of a same type as the first message, from the master base station, obtaining a third length of time, limited by receipt of the second message in a non-master base station and by receipt of the signal from the wireless tag in the non-master base station, and obtaining a fourth length of time, limited by receipt of the second message in the non-master base station and by receipt of the first message in the non-master base station and obtaining a ratio between the second length of time and the fourth length of time, and determining a time difference of arrival of the signal from the wireless tag between the master base station and the non-master base station as the first length of time from which is subtracted the third length of time multiplied by the ratio, from which is subtracted a time of flight at light speed from the master base station to the non-master base station.

According to a fifth aspect of the present disclosure, there is provided an apparatus comprising at least one processing core, at least one memory including computer program code, the at least one memory and the computer program code being configured to, with the at least one processing core, cause the apparatus at least to obtain a first length of time, limited by receipt of a second message in a first non-master base station and by receipt of a signal from a wireless tag in the first non-master base station, obtain a second length of time, limited by receipt of the second message in the first non-master base station and by receipt of a first message in the first non-master base station, obtain a third length of time, limited by receipt of the second message in a second non-master base station and by receipt of the signal from the wireless tag in the second non-master base station, obtain a fourth length of time, limited by receipt of the second message in the second non-master base station and by receipt of the first message in the second non-master base station and obtain a fifth length of time, limited by a time of transmission of the first message from a master base station and a time of transmission of the second message, of a same type as the first message, from the master base station, and determine a time difference of arrival of the signal from the wireless tag between the first and second non-master base stations as the first length of time multiplied by a ratio of the fifth length of time and the second length of time, to which is added a time of flight at light speed from the master base station to the first non-master base station and from which is subtracted a product of the third length of time and a ratio of the fifth length of time and the fourth length of time, and from which is subtracted a time of flight at light speed from the master base station to the second non-master base station.

According to a sixth aspect of the present disclosure, there is provided an apparatus comprising at least one processing core, at least one memory including computer program code, the at least one memory and the computer program code being configured to, with the at least one processing core, cause the apparatus at least to obtain a first length of time, limited by transmission of a second message from a master base station and by receipt of a signal from a wireless tag in the master base station, obtain a second length of time, limited by a time of transmission of a first message from a master base station and a time of transmission of the second message, of a same type as the first message, from the master base station, obtain a third length of time, limited by receipt of the second message in a non-master base station and by receipt of the signal from the wireless tag in the non-master base station, and obtain a fourth length of time, limited by receipt of the second message in the non-master base station and by receipt of the first message in the non-master base station and obtain a ratio between the second length of time and the fourth length of time, and determine a time difference of arrival of the signal from the wireless tag between the master base station and the non-master base station as the third length of time multiplied by the ratio, from which the first length of time is subtracted and to which a time of flight at light speed from the master base station to the non-master base station is added.

According to a seventh aspect of the present disclosure, there is provided a non-transitory computer readable medium having stored thereon a set of computer readable instructions that, when executed by at least one processor, cause an apparatus to at least obtain a first length of time, limited by receipt of a second message in a first non-master base station and by receipt of a signal from a wireless tag in the first non-master base station, obtain a second length of time, limited by receipt of the second message in the first non-master base station and by receipt of a first message in the first non-master base station, obtain a third length of time, limited by receipt of the second message in a second non-master base station and by receipt of the signal from the wireless tag in the second non-master base station, obtain a fourth length of time, limited by receipt of the second message in the second non-master base station and by receipt of the first message in the second non-master base station and obtain a fifth length of time, limited by a time of transmission of the first message from a master base station and a time of transmission of the second message, of a same type as the first message, from the master base station, and determine a time difference of arrival of the signal from the wireless tag between the first and second non-master base stations as the first length of time multiplied by a ratio of the fifth length of time and the second length of time, to which is added a time of flight at light speed from the master base station to the first non-master base station and from which is subtracted a product of the third length of time and a ratio of the fifth length of time and the fourth length of time, and from which is subtracted a time of flight at light speed from the master base station to the second non-master base station.

According to an eighth aspect of the present disclosure, there is provided a non-transitory computer readable medium having stored thereon a set of computer readable instructions that, when executed by at least one processor, cause an apparatus to at least obtain a first length of time, limited by transmission of a second message from a master base station and by receipt of a signal from a wireless tag in the master base station, obtain a second length of time, limited by a time of transmission of a first message from a master base station and a time of transmission of the second message, of a same type as the first message, from the master base station, obtain a third length of time, limited by receipt of the second message in a non-master base station and by receipt of the signal from the wireless tag in the non-master base station, and obtain a fourth length of time, limited by receipt of the second message in the non-master base station and by receipt of the first message in the non-master base station and obtain a ratio between the second length of time and the fourth length of time, and determine a time difference of arrival of the signal from the wireless tag between the master base station and the non-master base station as the third length of time multiplied by the ratio, from which the first length of time is subtracted and to which a time of flight at light speed from the master base station to the non-master base station is added.

According to a ninth aspect of the present disclosure, there is provided a computer program configured to cause a method according to at least one of the first, second, third or fourth aspects to be performed, when run.

EMBODIMENTS

In many known positioning methods, clock signal inaccuracies in a master base station and non-master base stations have all contributed to a positioning error. Positioning methods disclosed herein enable the determining of a position of a wireless node, such as a wireless tag, using TDOA positioning in a system where only a single master base station need have access to an accurate, precise clock signal. A master base station acts as a TDOA reference device in the determination of duration of at least one accurate time period.

Figure 1:
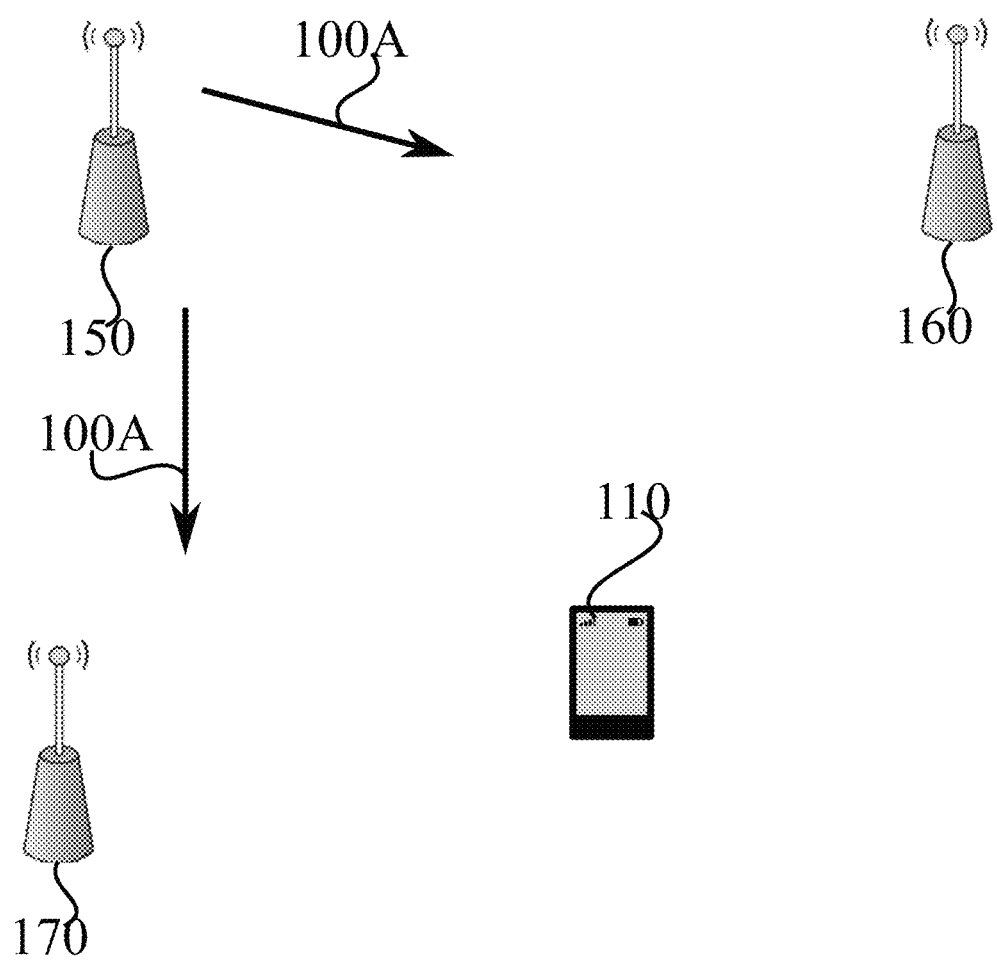
FIG. 1 illustrates an example system in accordance with at least some embodiments of the present invention.

FIG. 1 illustrates an example system in accordance with at least some embodiments of the present invention. The example system of FIG. 1 comprises master base station 150 and non-master base stations 160 and 170. Locations of the base stations are known, wherefore also distances between the base stations are known. Since distances between the base stations are known, also the time of flight of radio signals, propagating at light speed, between the base stations are known. In case sound signals are used, the time of flight takes place at the speed of sound. One master and two non-master base stations is one numerical example to which the present invention is not limited, rather, the principles of the present invention are usable with one master and two, four or indeed another number of non-master base stations, for example. In some cases, a larger number of non-master base stations results in a more accurate location estimate. In general, the set of base stations may comprise one master base station and at least one non-master base station. In general, the set of base stations may be comprised in or as an indoor wireless network, for example based on ultra wide band, UWB, or wireless local area network, WLAN, technology.

The expression "base station" is used herein as a terminological choice, by which it is not intended to limit the scope of the disclosure. In cellular technologies the expression "base station" is common, while in non-cellular technologies the expression "access point" may be used. Examples of cellular technologies include long term evolution, LTE, and wideband code division multiple access, WCDMA. Examples of non-cellular technologies include WLAN, and worldwide interoperability for microwave access, WiMAX. However, the meaning is essentially the same, that being a fixed node with which a user device may communicate using a wireless communication interface. This fixed node transmits in the downlink and receives in the uplink. The term "base station" herein covers also nodes which may be referred to as access points, or indeed by other terms, as long as the node transmits in the downlink and receives in the uplink.

As noted, the base stations may be configured to operate in accordance with a suitable radio technology, such as, for example, ultra wide band, UWB. UWB is a technology for transmitting using a large bandwidth, for example wider than 500 megahertz or wider than 700 megahertz. UWB communications may be based on an impulse radio, which may employ a combination of burst position modulation, BPM, and binary phase shift keying, BPSK, for example. IEEE standard 802.15.4-2011 contains an example of such a UWB communication technology. Other impulse radio technologies may alternatively or in addition be used, which enable a sufficiently accurate signal transmit and reception time determination for example, to effectively make use of the wide frequency range. Other example technologies include cellular and non-cellular technologies. In some embodiments, the base stations may be configured to operate a wireless communication technology that based on an optical signal or sound signal. Also such technologies enable signal transmission and reception time determination.

The system illustrated in FIG. 1 further comprises tag 110. The tag, or more generally, user device, may be configured to communicate wirelessly with the base stations to receive service from them, for example. For example, tag 110 may access network resources and/or obtain positioning service from the base stations to determine the geographic position of tag 110. The tag may comprise a device enabled to receive wireless messages transmitted by the base stations, such as master base station 150 and non-master base stations 160 and 170, and to perform mathematical operations. To enable this, each tag may comprise a wireless receiver, at least one processing core and memory. Tag 110 is configured to transmit a signal, such as a low-energy electromagnetic blink signal, for example. The signal may be an UWB signal with a spectral width of at least 500 MHz, for example. The signal may be an impulse radio signal of at least 500 MHz spectral width.

In FIG. 1, master base station 150 transmits an initial message 100A. Initial message 100A may be transmitted from master base station 150 in a non-directed manner, that is, omnidirectionally or to a broad set of directions in the sense that the message is not transmitted only to a specific, single direction. This enables reception of the initial message 100A by plural nodes, such as by the non-master base stations. The master base station may record a first timestamp 100A_TX, indicating a point in time, when the master base station transmits the initial message. The master base station may, for example, obtain a current time from an internal clock of the master base station, compile the initial message using the current time and send the initial message without waiting. In some embodiments, the master base station may augment the current time obtained from the internal clock with a delay value which corresponds to the time it takes the master base station to transmit the message, such that the timestamp more accurately reflects the moment in time the initial message issues from antennas of the master base station. Delay values for different base stations may be configured during system setup or calibration, or at manufacture of the base stations, for example. The delay values are useful, for example, where the master base station and the non-master base stations have different electronics.

Initial message 100A may be sent by the master base station more than once, for example, master base station 150 may transmit two copies of initial message 100A upon request, or master base station 150 may transmit initial message 100A periodically with a fixed periodicity, that is, a constant length of time between two consecutive initial messages 100A. A second timestamp may have been recorded by master base station 100A concerning transmission of the immediately preceding initial message 100A. The length of time between the transmissions of the two initial messages would thus be limited by the first and second timestamps.

The initial messages 100A are received in the non-master base stations 160, 170, which record timestamps indicating when the initial messages 100A are received. As the non-master base stations are not necessarily required to have very accurate internal clocks, these non-master base stations determine length of time between consecutive receptions of initial messages 100A.

Figure 2:
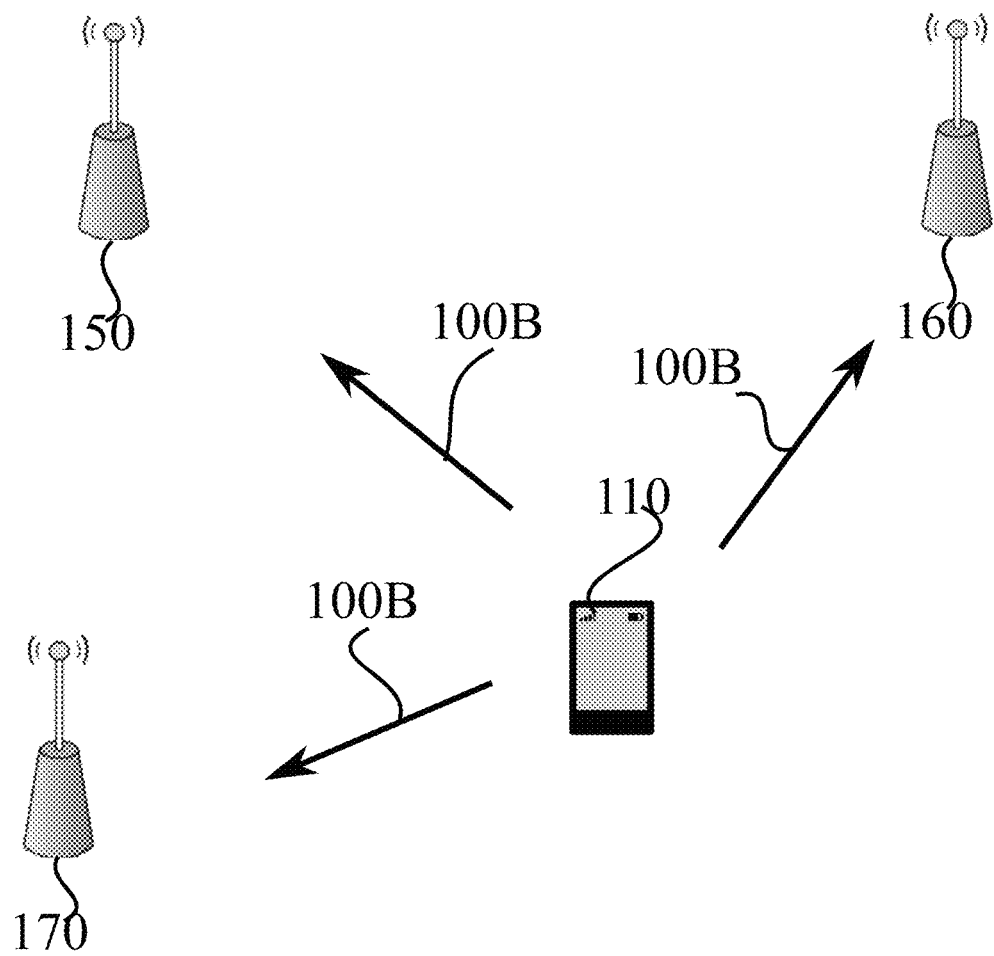
FIG. 2 illustrates an example system in accordance with at least some embodiments of the present invention.

FIG. 2 illustrates an example system in accordance with at least some embodiments of the present invention. The system of FIG. 2 corresponds to that of FIG. 1. In the situation of FIG. 1, an initial message 100A has been sent from master base station 150 and received in non-master base stations 160, 170. The tag 110 transmits the signal 100B described above, for example omnidirectionally, such that the base stations are enabled to receive it. This signal is received in non-master base stations, which record a time of receipt of the signal at the non-master base station. The master base station receives signal 100B and records a receipt timestamp indicating a time of receipt of signal 100B in the master base station.

The master base station and the base stations each have time counters. The time counters may have a maximum value 0xffffffff in hexadecimal, for example. The time counters may keep track of time, for example using a clock which has a 64 GHz clock frequency. Once a time counter reaches its maximum value, it may loop back to zero. The time counters may be employed in generating sending and receiving timestamps as described herein. The master base station and non-master base stations may start in an unsynchronized manner, and these clocks may have frequency offsets, dynamic noise and static noise. Each radio device has an antenna delay which, strictly speaking, is specific to the radio device. Further, signal power levels at receipt may introduce timing errors. Communicating a duration of a time period provides the effect that it overcomes issues from starting the clocks in an unsynchronized manner.

Non-master base stations obtain lengths of time limited by receipt in the non-master base station of the signal from tag 110 and receipt in the non-master base station of the immediately preceding initial message 100A. The non-master base stations therefore may record two lengths of time: a first length of time from receipt of the most recent initial message 100A to receipt of the signal 100B from the tag, and a second length of time from receipt of the most recent initial message 100A to the next initial message 100A. The non-master base stations may report these lengths of time to the master base station, or to another node tasked with positioning the wireless tag 110. The node tasked with positioning wireless tag 110 may thus be the master base station, or another entity. The non-master base stations 160, 170 may provide the lengths of time to the node tasked with positioning wireless tag 110 directly, or via master base station 150, for example. The determination of the time difference of arrival, TDOA, of the signal from wireless tag 110 in non-master base stations 160, 170 will be described with reference to FIG. 3.

Alternatively to reporting lengths of time to the master base station or to the other node tasked with positioning wireless tag 110, the non-master base stations may report their timestamps of receipt of the 100A and 100B messages, enabling the master base station or other node to calculate the lengths of time. The effect is the same, namely that the master base station or other node obtains the lengths of time. Likewise, when the other node determines the position of wireless tag 110, the master base station may report either lengths of time or of the timestamps. Wireless communication, either of lengths of time or of timestamps, may be based on UWB, Bluetooth low energy, BLE, WLAN or the long range, LoRa, spread spectrum wireless technology. Also wire-line communication may be used in the communicating of the timestamps and/or lengths of time.

In the overall determination of the location of wireless tag 110, plural systems may be used, such that overall plural master base stations may be involved. The eventual location estimate of wireless tag 110 may be the average of estimates obtained using the involved systems, for example. An overall positioning system with plural master base stations controlling non-master base stations, wherein some of the non-master base stations may be shared between at least two of the master base stations, may be used to determine a location of a wireless tag. As noted above, a master base station may be configured to determine the location of wireless tag 110, or another node may be configured to do this. When the other node is so configured, the other node may comprise an on-site computer, a gateway device or a cloud computing server, for example.

Figure 3:
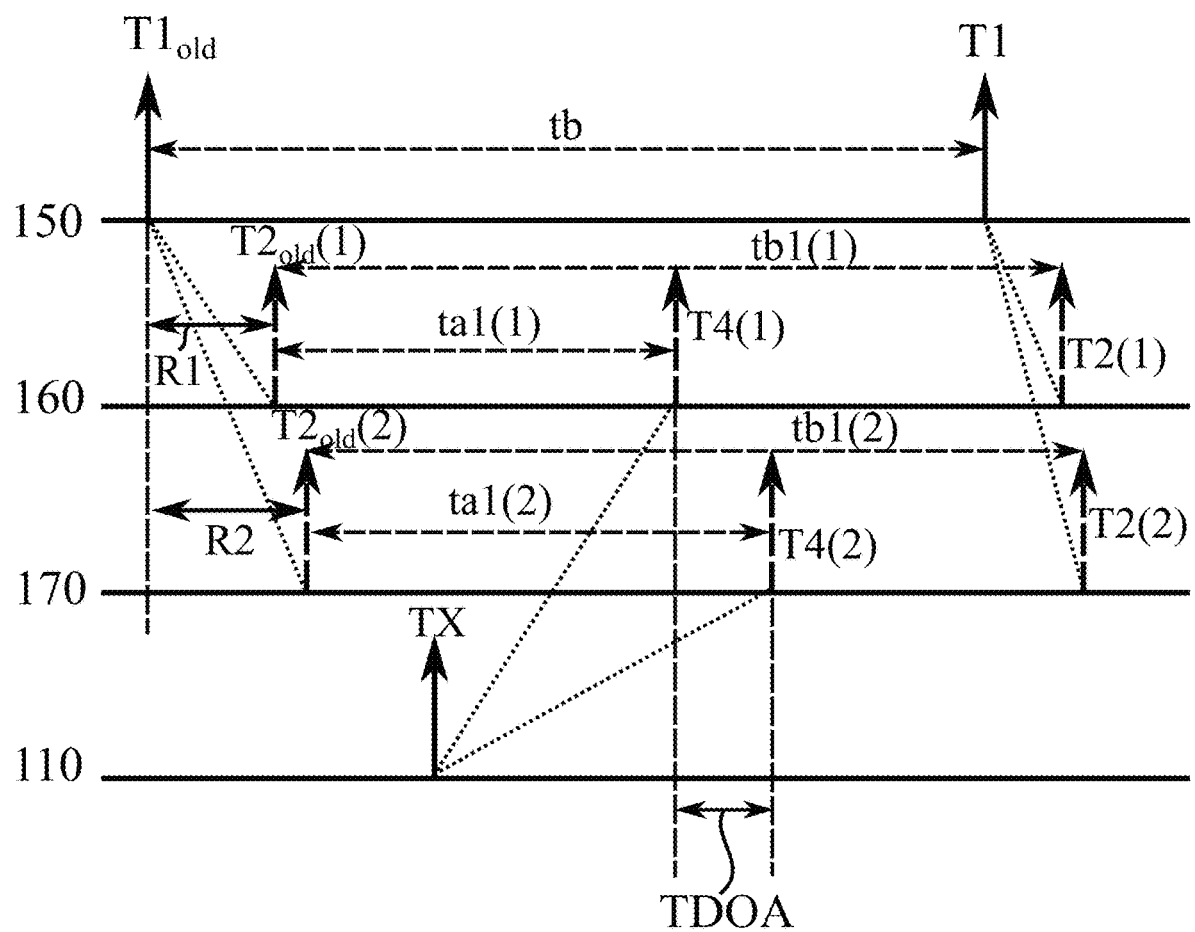
FIG. 3 illustrates TDOA determination in accordance with a first set of embodiments.

FIG. 3 illustrates TDOA determination in accordance with a first set of embodiments. The horizontal axes correspond to master base station 150, non-master base stations 160, 170, and to wireless tag 110, as labelled in the figure. Time advances from the left toward the right.

Solid vertical arrows denote transmission of signals, and dashed vertical arrows denote reception of signals. First timestamp T1 corresponds to transmission of an initial message 100A from master base station, and second timestamp $T1_{old}$ corresponds to transmission of an immediately preceding initial message 100A from the master base station. Time interval tb is the length of time between transmissions of the two initial messages 100A from master base station 150. Time interval tb may be referred to overall as a fifth length of time. Time interval tb may be obtained by subtracting $T1-T1_{old}$. Similarly, the first, second, third and fourth lengths of time may be obtained as a difference between two counter values, a single counter value acting as a timestamp.

Timestamp T2(1) corresponds to reception of the initial message 100A sent at the first timestamp T1 at non-master base station 160, and timestamp T2(2) corresponds to reception of the initial message 100A sent at the first timestamp T1 at non-master base station 170. Likewise, timestamp $T2_{old}(1)$ corresponds to reception of the initial message 100A sent at the second timestamp $T1_{old}$ at non-master base station 160, and timestamp $T2_{old}(2)$ corresponds to reception of the initial message 100A sent at the second timestamp $T1_{old}$ at non-master base station 170. The time-of-flight from master base station 150 to non-master base station 160 is R1, and the time-of-flight from master base station 150 to non-master base station 170 is R2.

TX is the transmission of the signal from wireless tag 110. This signal is received at non-master base station 160 at timestamp T4(1), and the same signal is received in non-master base station 170 at timestamp T4(2). The TDOA of this signal between these two non-master base stations 160, 170 is denoted "TDOA" in the figure.

Non-master base station 160 thus obtains a first length of time ta1(1) from receipt $T2_{old}(1)$ of the most recent initial message 100A to receipt T4(1) of the signal 100B from the tag, and a second length of time tb1(1) from receipt $T2_{old}(1)$ of the most recent initial message 100A to receipt T2(1) of the next initial message 100A.

Non-master base station 170 thus obtains a third length of time ta1(2) from receipt $T2_{old}(2)$ of the most recent initial message 100A to receipt T4(2) of the signal 100B from the tag, and a fourth length of time tb1(2) from receipt $T2_{old}(2)$ of the most recent initial message 100A to receipt T2(2) of the next initial message 100A.

The TDOA of signal TX between non-master base stations 160 and 170 may then be obtained as:

$$TDOA(160,170)=ta1(1) \times tb/tb1(1)+R1-(ta1(2) \times tb/tb1(2)+R2),$$

or alternatively as $$TDOA(160,170)=ta1(2) \times tb/tb1(2)+R2-(ta1(1) \times tb/tb1(1)+R1).$$

Plural ones of such TDOAs (obtained from plural pairs of non-master base stations) may be used to solve the geographic position of wireless tag 110. As the system may comprise more than two non-master base stations, the number of TDOAs obtained from a single signal TX from wireless tag 100 may be fairly large. When there are more TDOAs than strictly needed to solve the position of wireless tag 110, the increasing number of TDOAs have the effect that positioning error is reduced.

Figure 4:
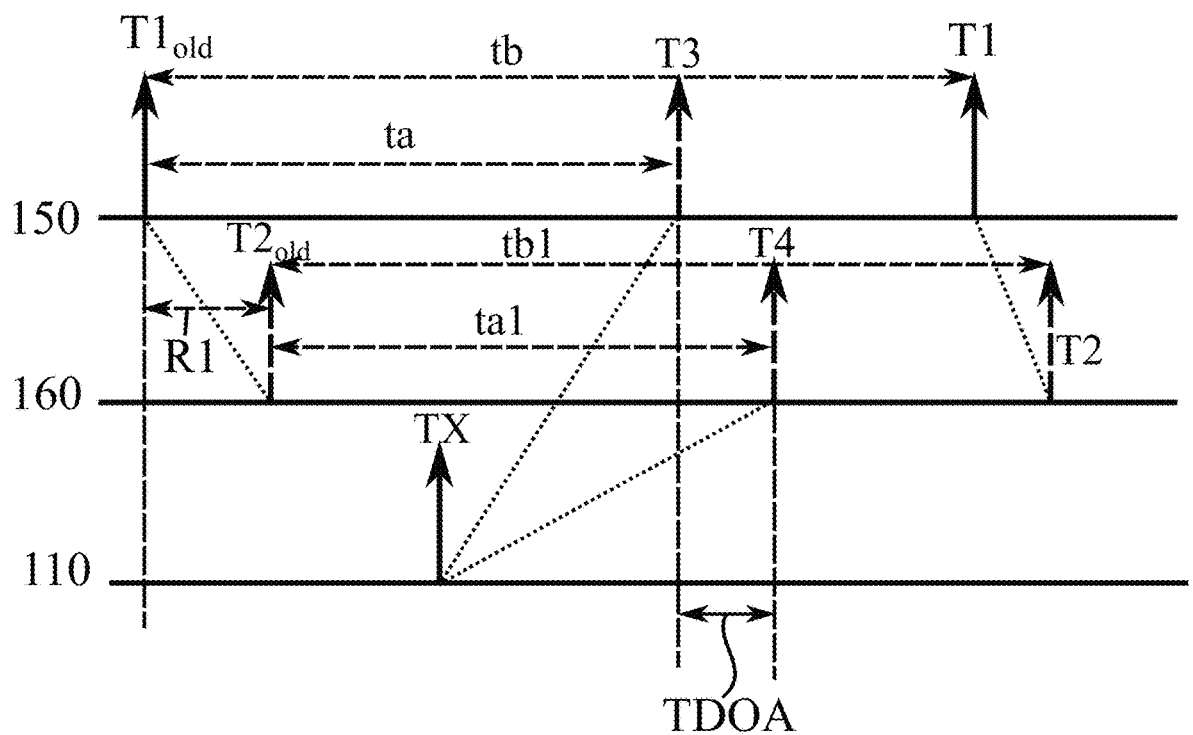
FIG. 4 illustrates TDOA determination in accordance with a second set of embodiments.

FIG. 4 illustrates TDOA determination in accordance with a second set of embodiments. In these embodiments, the TDOA is determined between the master base station and a non-master base station.

As in FIG. 3, the master base station transmits initial messages 100A at times T1 and $T1_{old}$. These messages are received by non-master base station 160 at times T2 and $T2_{old}$, respectively. The wireless tag 110 transmits its wireless signal TX, which is received by master base station 150 at time instant T3, and by non-master base station 160 at time instant T4. The time difference between T3 and T4 is the TDOA of this signal between master base station 150 and non-master base station 160.

Four lengths of time may be defined: a first length of time ta limited by T3 and $T1_{old}$, a second length of time tb limited by $T1_{old}$ and T1, a third length of time ta1 limited by T4 and $T2_{old}$, and a fourth length of time tb1 limited by T2 and $T2_{old}$.

The TDOA of signal TX between master base station 150 and non-master base station 160 may be obtained as:

$$TDOA(150,160)=ta1(1) \times SYNC(1)-ta+R1,$$

or alternatively as $$TDOA(150,160)=(ta-ta1(1) \times SYNC(1)-R1, \text{ where } SYNC(1)=tb/tb1(1).$$

Plural ones of such TDOAs may be used to solve the geographic position of wireless tag 110. As the system may comprise more than two non-master base stations, the number of TDOAs obtained from a single signal TX from wireless tag 100 may be fairly large. When there are more TDOAs than strictly needed to solve the position of wireless tag 110, the increasing number of TDOAs have the effect that positioning error is reduced. In some embodiments, both time differences of arrival between two non-master base stations and between master- and non-master base stations may be used together.

In both the FIG. 3 and FIG. 4 embodiments, the TDOA may be scaled by multiplying it with a time unit, such as a time unit equal to 1/64 GHz or 1/128 GHz, for example.

A technical effect and benefit of the methods disclosed herein is that wireless tag 110 may be positioned in a network of one master and plural non-master base stations using three messages, wherein the master base station transmits two messages 100A and the wireless tag transmits a single message 100B. TDOA values may be determined between all base stations within range of wireless tag 110, wherefore as the number of base stations may be large, the number of TDOA values obtained from these three messages may be high, enabling accurate positioning of wireless tag 110. This mechanism enables a positioning system with in principle unlimited range using an overall system where plural master base stations control non-master base stations, wherein some of the non-master base stations may be shared between at least two of the master base stations.

The methods disclosed herein overcome the technical problem of antenna delays being specific to individual radio devices, owing to manufacturing differences in individual parts, since lengths of time are determined from timestamps expressed as counter values in the individual base stations. The base station-specific antenna/RF delay is cancelled out from the computation of the length of time since it is identical in the receipt of all signals in this base station.

Figure 5:
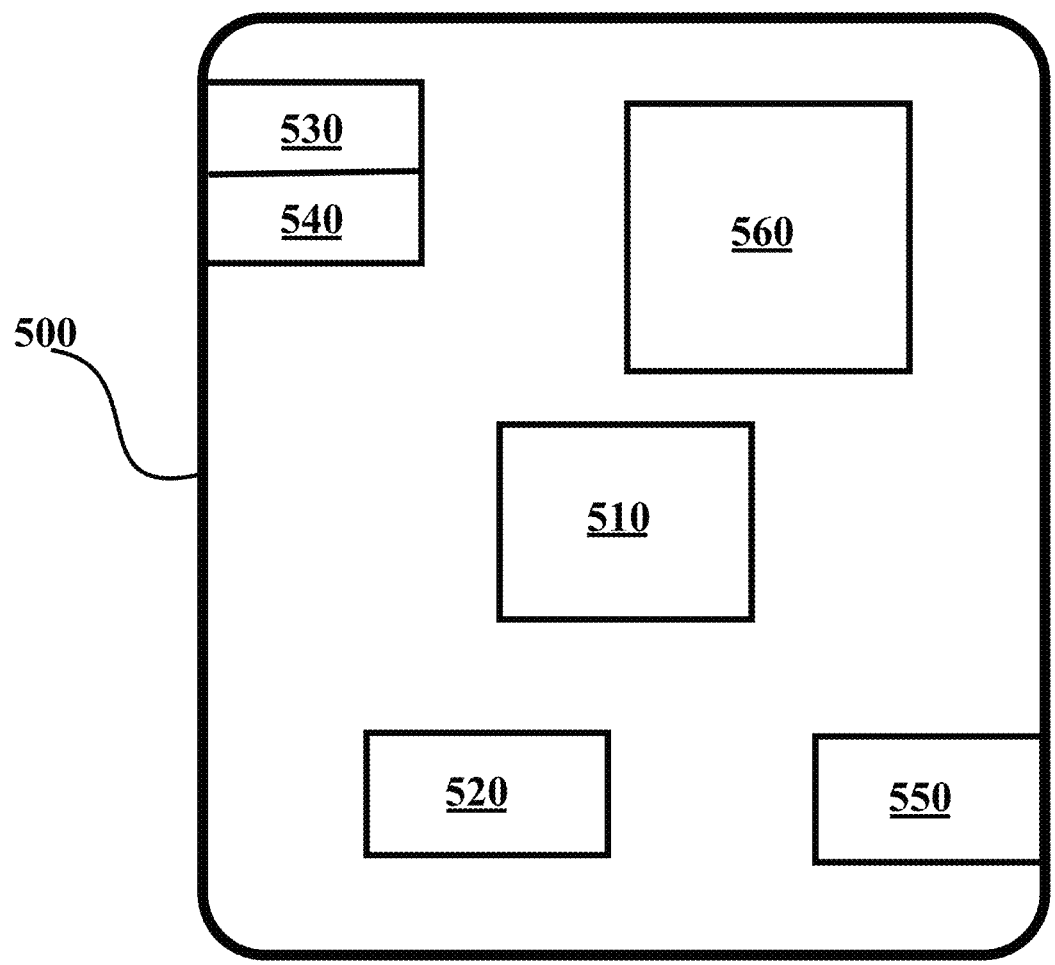
FIG. 5 illustrates an example apparatus capable of supporting at least some embodiments of the present invention.

FIG. 5 illustrates an example apparatus capable of supporting at least some embodiments of the present invention. Illustrated is device 500, which may comprise, for example, an electronic device such as a base station or tag of FIG. 1 or FIG. 2. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Zen processing core designed by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 and receiver 540 may be comprised in a single transceiver. Transmitter 530 may comprise more than one transmitter. Receiver 540 may comprise more than one receiver. Transmitter 530 and/or receiver 540 may be configured to operate in accordance with global system for mobile communication, GSM, wideband code division multiple access, WCDMA, 5G, long term evolution, LTE, UWB, UWB, wireless local area network, WLAN, Ethernet and/or worldwide interoperability for microwave access, WiMAX, standards, for example.

Device 500 may comprise a near-field communication, NFC, transceiver 550. NFC transceiver 550 may support at least one NFC technology, such as NFC, Bluetooth, Wibree or similar technologies.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to configure positioning parameters.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver. Device 500 may comprise further devices not illustrated in FIG. 5.

Processor 510, memory 520, transmitter 530, receiver 540, NFC transceiver 550 and/or UI 560 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
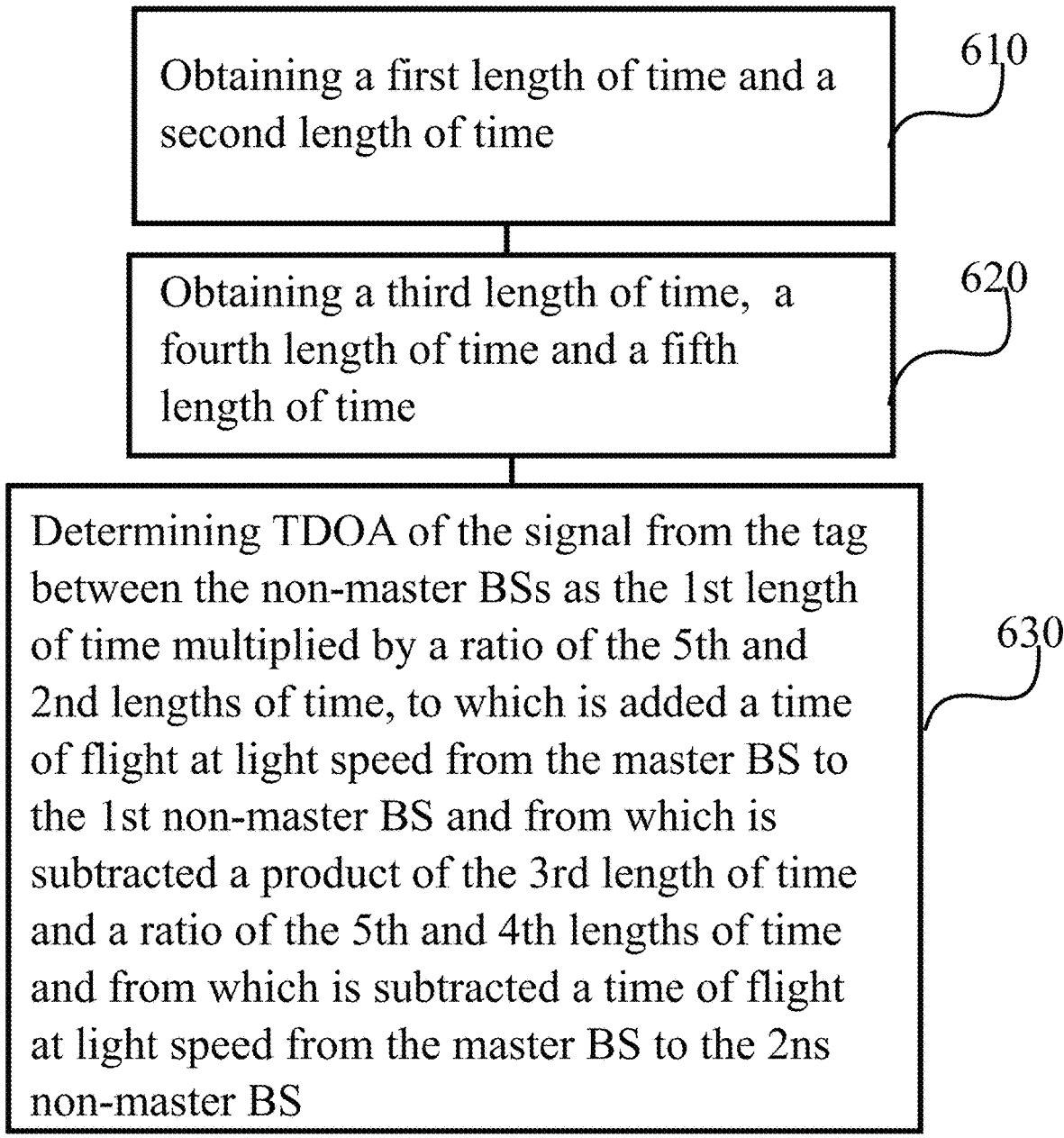
FIG. 6 is a flow graph of a method in accordance with at least some embodiments of the present invention.

FIG. 6 is a flow graph of a method in accordance with at least some embodiments of the present invention. The phases of the illustrated method may be performed in the node tasked with positioning wireless tag 110. As described above, this node may be the master base station or a further entity. As noted above, this further entity may comprise a node such as an on-site computer, gateway device or cloud computing server, for example.

Phase 610 comprises obtaining the first and second lengths of time. Phase 620 comprises obtaining the third, fourth and fifth lengths of time. These lengths of time have been discussed herein above.

Phase 630 comprises determining a time difference of arrival of the signal from the wireless tag between the first and second non-master base stations as the first length of time multiplied by a ratio of the fifth length of time and the second length of time, to which is added a time of flight at light speed from the master base station to the first non-master base station and from which is subtracted a product of the third length of time and a ratio of the fifth length of time and the fourth length of time, and from which is subtracted a time of flight at light speed from the master base station to the second non-master base station.

Figure 7:
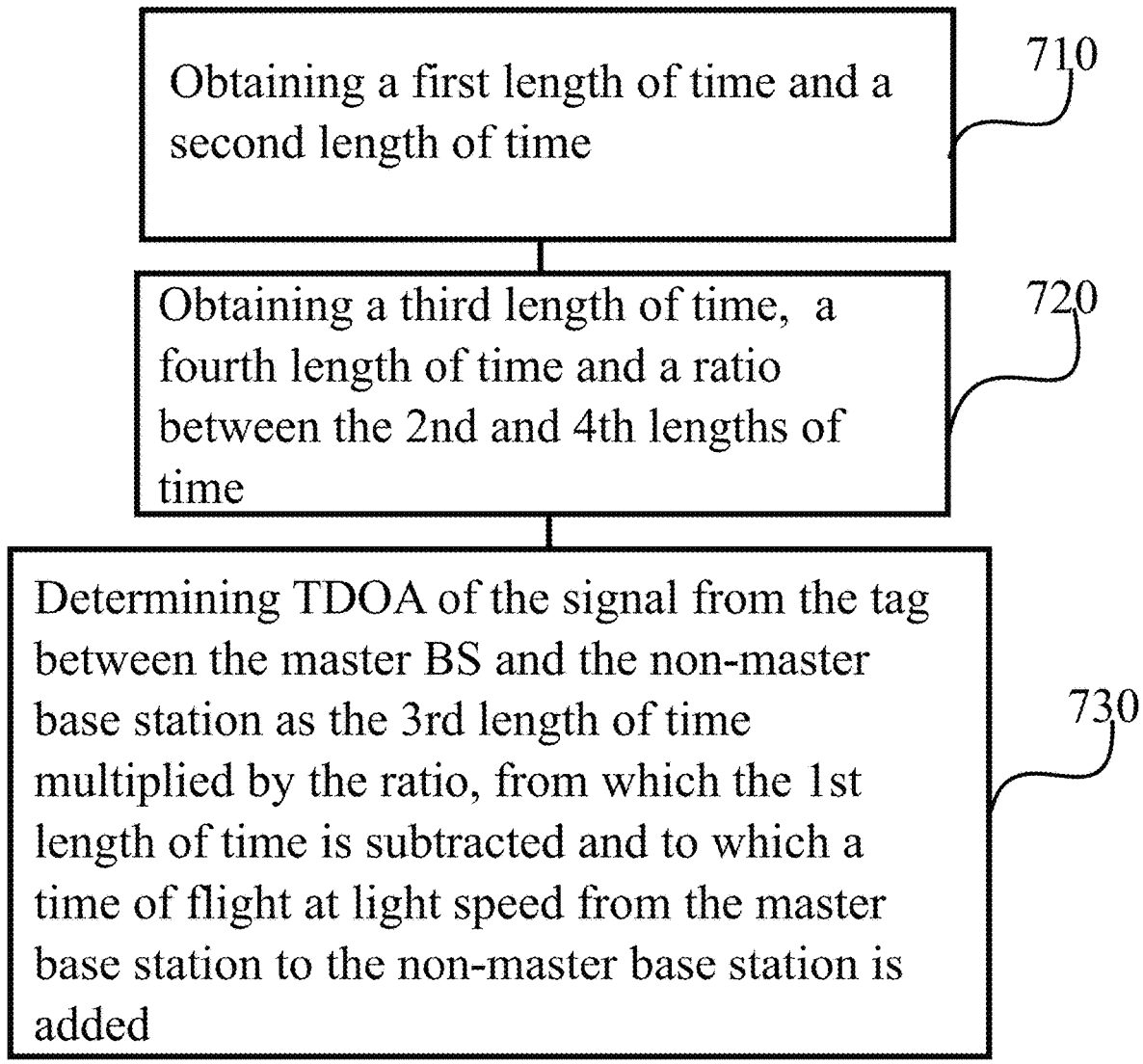
FIG. 7 is a flow graph of a method in accordance with at least some embodiments of the present invention.

FIG. 7 is a flow graph of a method in accordance with at least some embodiments of the present invention. The phases of the illustrated method may be performed in the node tasked with positioning wireless tag 110. As described above, this node may be the master base station or a further entity.

Phase 710 comprises obtaining a first length of time and a second length of time. Phase 720 comprises obtaining a third length of time, a fourth length of time and a ratio between the second length of time and the fourth length of time.

Phase 730 comprises determining a time difference of arrival of the signal from the wireless tag between the master base station and the non-master base station as the third length of time multiplied by the ratio, from which the first length of time is subtracted and to which a time of flight at light speed from the master base station to the non-master base station is added.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless positioning.

ACRONYMS LIST

TDOA time difference of arrival location
UWB ultra wide band

| REFERENCE SIGNS LIST | |
| --- | --- |
| 110 | tag |
| 150 | master base station |
| 160, 170 | non-master base station |
| 100A | initial message |
| 100B | signal from tag 110 |
| 500-560 | structure of the device of FIG. 5 |
| 610-630 | phases of the method of FIG. 6 |
| 710-730 | phases of the method of FIG. 6 |

The invention claimed is:

1. A method comprising:
obtaining a first length of time, limited by receipt of a second message in a first non-master base station and by receipt of a signal from a wireless tag in the first non-master base station, obtaining a second length of time, limited by receipt of the second message in the first non-master base station and by receipt of a first message in the first non-master base station;
obtaining a third length of time, limited by receipt of the second message in a second non-master base station and by receipt of the signal from the wireless tag in the second non-master base station, obtaining a fourth length of time, limited by receipt of the second message in the second non-master base station and by receipt of the first message in the second non-master base station and obtaining a fifth length of time, limited by a time of transmission of the first message from a master base station and a time of transmission of the second message, of a same type as the first message, from the master base station, and
determining a time difference of arrival of the signal from the wireless tag between the first and second non-master base stations as the third length of time multiplied by a ratio of the fifth length of time and the fourth length of time, to which is added a time of flight at light speed from the master base station to the second non-master base station and from which is subtracted a product of the first length of time and a ratio of the fifth length of time and the second length of time, and from which is subtracted a time of flight at light speed from the master base station to the first non-master base station.

2. The method according to claim 1, wherein the signal from the wireless tag has a spectral width of at least 500 megahertz.

3. The method according to claim 1, further comprising multiplying the determined time difference of arrival of the signal with a time unit.

4. The method according to claim 3, further comprising determining a second and a third time difference of arrival of the signal, between a third and fourth, and a fifth and sixth, non-master base station, respectively.

5. The method according to claim 4, further comprising determining a position estimate of the wireless tag based at least in part on the time difference of arrival of the signal and the second and third time differences of arrival of the signal.

6. The method according to claim 3, wherein the signal from the wireless tag has a spectral width of at least 500 megahertz.

7. The method according to claim 1, further comprising determining a second and a third time difference of arrival of the signal, between a third and fourth, and a fifth and sixth, non-master base station, respectively.

8. The method according to claim 7, wherein the signal from the wireless tag has a spectral width of at least 500 megahertz.

9. The method according to claim 7, further comprising determining a position estimate of the wireless tag based at least in part on the time difference of arrival of the signal and the second and third time differences of arrival of the signal.

10. The method according to claim 9, wherein the signal from the wireless tag has a spectral width of at least 500 megahertz.

11. A non-transitory computer readable medium having stored thereon a set of computer readable instructions that, when executed by at least one processor, cause an apparatus to at least: perform the method of claim 1.

12. A method comprising:
obtaining a first length of time, limited by transmission of a second message from a master base station and by receipt of a signal from a wireless tag in the master base station, obtaining a second length of time, limited by a time of transmission of a first message from a master base station and a time of transmission of the second message, of a same type as the first message, from the master base station;
obtaining a third length of time, limited by receipt of the second message in a non-master base station and by receipt of the signal from the wireless tag in the non-master base station, and obtaining a fourth length of time, limited by receipt of the second message in the non-master base station and by receipt of the first message in the non-master base station and obtaining a ratio between the second length of time and the fourth length of time; and determining a time difference of arrival of the signal from the wireless tag between the master base station and the non-master base station as the first length of time from which is subtracted the third length of time multiplied by the ratio, from which is subtracted a time of flight at light speed from the master base station to the non-master base station.

13. The method according to claim 12, further comprising multiplying the determined time difference of arrival of the signal with a time unit.

14. The method according to claim 13, further comprising determining a second and a third time difference of arrival of the signal, between the master base station and a second and third non-master base station, respectively.

15. The method according to claim 14, further comprising determining a position estimate of the wireless tag based at least in part on the time difference of arrival of the signal and the second and third time differences of arrival of the signal.

16. The method according to claim 12, further comprising determining a second and a third time difference of arrival of the signal, between the master base station and a second and third non-master base station, respectively.

17. The method according to claim 16, further comprising determining a position estimate of the wireless tag based at least in part on the time difference of arrival of the signal and the second and third time differences of arrival of the signal.

18. An apparatus comprising at least one processing core, at least one memory including computer program code, the at least one memory and the computer program code being configured to, with the at least one processing core, cause the apparatus at least to: perform the method of claim 12.

19. A non-transitory computer readable medium having stored thereon a set of computer readable instructions that, when executed by at least one processor, cause an apparatus to at least: perform the method of claim 12.

20. An apparatus comprising at least one processing core, at least one memory including computer program code, the at least one memory and the computer program code being configured to, with the at least one processing core, cause the apparatus at least to:

obtain a first length of time, limited by receipt of a second message in a first non-master base station and by receipt of a signal from a wireless tag in the first non-master base station, obtain a second length of time, limited by receipt of the second message in the first non-master base station and by receipt of a first message in the first non-master base station;

obtain a third length of time, limited by receipt of the second message in a second non-master base station and by receipt of the signal from the wireless tag in the second non-master base station, obtain a fourth length of time, limited by receipt of the second message in the second non-master base station and by receipt of the first message in the second non-master base station and obtain a fifth length of time, limited by a time of transmission of the first message from a master base station and a time of transmission of the second message, of a same type as the first message, from the master base station, and determine a time difference of arrival of the signal from the wireless tag between the first and second non-master base stations as the first length of time multiplied by a ratio of the fifth length of time and the second length of time, to which is added a time of flight at light speed from the master base station to the first non-master base station and from which is subtracted a product of the third length of time and a ratio of the fifth length of time and the fourth length of time, and from which is subtracted a time of flight at light speed from the master base station to the second non-master base station.

* * * * *